(12) United States Patent
Watson

(10) Patent No.: US 7,320,133 B2
(45) Date of Patent: Jan. 15, 2008

(54) DISC HOLDER FOR DISCS HAVING AN INTERIOR HOLE, AND METHOD OF USING THE DISC HOLDER

(76) Inventor: Joseph Eric Watson, 9071 E. Mississippi, 24-G, Denver, CO (US) 80247

( * ) Notice: Subject to any disclaimer, the term of this patent is extended or adjusted under 35 U.S.C. 154(b) by 566 days.

(21) Appl. No.: 10/741,527

(22) Filed: Dec. 19, 2003

(65) Prior Publication Data

US 2005/0133390 A1    Jun. 23, 2005

(51) Int. Cl.
  *G11B 23/03*  (2006.01)
  *B65D 85/57*  (2006.01)

(52) U.S. Cl. .................... 720/737; 206/307.1
(58) Field of Classification Search .......... 720/695; 206/307, 308.1, 310; 248/176.1
  See application file for complete search history.

(56) References Cited

U.S. PATENT DOCUMENTS

| | | | | |
|---|---|---|---|---|
| 2,688,490 A | * | 9/1954 | Schumaker | 369/208 |
| 2,717,472 A | * | 9/1955 | Wilmington | 248/206.2 |
| 2,773,727 A | * | 12/1956 | Bradley | 312/9.9 |
| 5,887,713 A | * | 3/1999 | Smith et al. | 206/308.1 |
| D429,578 S | * | 8/2000 | Vesco | D6/407 |
| 6,164,445 A | * | 12/2000 | Cooper | 206/308.1 |
| 6,250,461 B1 | * | 6/2001 | Hu | 206/310 |
| D478,736 S | | 8/2003 | Scanlan | |
| 6,666,418 B1 | | 12/2003 | Scanlan | |
| D494,381 S | | 8/2004 | Ruscitto | |
| 2002/0070323 A1 | * | 6/2002 | Barich et al. | 248/229.16 |

* cited by examiner

*Primary Examiner*—Angel Castro
(74) *Attorney, Agent, or Firm*—Blakely, Sokoloff, Taylor & Zafman LLP

(57) ABSTRACT

Apparatus to hold discs and other objects having interior holes are disclosed. An apparatus, in one aspect, may include a base, a top that is dimensioned smaller than a diameter of an interior hole of a data storage disc to allow the top to pass through the hole, sides connecting the top with the base, and a disc support surface of the sides to support the disc if the top is passed through the hole and the disc is rested on the sides. An apparatus, in another aspect, may include a disc holder including an electrically conductive material, and a conductive line coupled at a first end thereof with the electrically conductive material of the disc holder to conduct static electricity away from the conductive material. Methods of using the apparatus to hold the discs and other objects having interior holes are also disclosed.

20 Claims, 8 Drawing Sheets

US 7,320,133 B2

DISC HOLDER FOR DISCS HAVING AN INTERIOR HOLE, AND METHOD OF USING THE DISC HOLDER

BACKGROUND

1. Field

An embodiment of the invention relates to a holder for an object having an interior hole, for example for a compact disc (CD) or digital video disc (DVD), and to a method of using the holder.

2. Background Information

Compact discs (CD's) and digital video discs (DVD's) are currently very popular and prevalent data storage mediums for storing music, movies, computer software, and other forms of digital data. Physically, the CD's and DVD's are thin, circular optical storage discs and have measurements of about 1 millimeters (mm) in thickness, and 12 centimeters (cm) in diameter. The discs have a single, central, interior hole, which has a diameter of about 1.5 cm. The discs are typically formed of polycarbonate, or another plastic material.

The digital data is generally stored on the discs in an optically readable format. The data is typically written into pits, or depressions, which may be sensed or read from a data surface on the underside of the discs, with the use of an optical system. The undersides of the discs accordingly represent sensitive data surfaces that should not be scratched, dirtied, or otherwise degraded. Otherwise, it may not be possible to recover the digital data with fidelity.

Various devices to protect CD's and DVD's are known in commerce. In order to put the inventors developments in context, and to help the reader in understanding the significance of the present invention, it may be helpful to discuss some of the devices that are currently in widespread use. CD's and DVD's are typically purchased and stored in thin, plastic, hinged cases, commonly referred to as jewel cases.

FIG. 1 is a perspective view showing a prior art jewel case 100 that may be used to store a CD or DVD disc 160. The disc includes a central hole 162 and a sensitive data surface 164. The jewel case is a plastic container that includes a back 102, a hinged cover 104, a disc storage compartment 106 to store the disc, and a locking post 108 to lock the disc in the compartment. A user 180 may insert the disc in the compartment, lock the hole around the locking post, and close the hinged cover to store the disc inside the jewel case.

Although prevalent, there are a number of salient disadvantages associated with the use of jewel cases for the storage of discs. For one thing, the jewel cases generally sacrifice disc accessibility, and user convenience, in favor of disc protection. Often, the storage of a disc in a jewel case, and the subsequent removal of the disc from the jewel case, may be time consuming and laborious. In a representative use, the hinged cover of the jewel case may be opened, the disc may be snapped onto the locking post of the jewel case, and then the hinged cover may be closed. Two hands are generally needed in order to handle both the disc and the case. Those who use jewel cases often, such as software professionals, will appreciate that there is an opportunity cost associated with performing each of these operations. Additionally, when stored in the case, the disc is not readily accessible to the user, and the case needs to be re-opened, etc. in order to recover the disc.

Another salient disadvantage with jewel cases, is that due to their time consuming and labor intensive nature, users may neglect the proper use of the jewel cases, in favor of disc accessibility, speed, and convenience. In many instances, the users may not even bother to place the discs back into the jewel cases. The users may instead simply set the discs on a convenient desktop or other surface. This may put the sensitive data surface of the discs at risk. It is generally advisable not to contact the data surface with materials that may cause scratching or contamination. Placing the discs on desktops, or on the top of CD or DVD players, may harm the discs. The surfaces may have rough spots, or dirt, dust, or other particles. In general, the inventor has recognized that anything besides air may potentially cause scratching or contamination. Later, when the disc is needed, the thin aspect ratio of the disc may make it difficult for the user to remove the disc from the surface without sliding the disc across the surface. Such sliding of the disc may cause scratching and contamination of the data surface.

In some instances, the disc may be placed on the surface with the data surface facing up, to help to reduce scratching and contamination. However, the data surface is generally devoid of markings, and it may be difficult to subsequently identify the disc. Additionally, such placement may promote directly touching the data surface, which may cause contamination with oils from the skin.

Sleeves have also been employed to protect CD's and DVD's. The sleeves may provide somewhat greater disc accessibility compared to jewel cases, but they generally provide less disc protection. Dirt and other particles may potentially be introduced into the sleeve, and scratch or contaminate the disc as it is slid into and out of the sleeve.

Accordingly, there is a general need in the art for new and improved disc holders.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

Disclosed herein are holders for objects having interior holes, such as CD's or DVD's, and methods of using the holders. In the following description, numerous specific details are set forth. However, it is understood that embodiments of the invention may be practiced without these specific details. In other instances, well-known structures and techniques have not been shown in detail in order not to obscure the understanding of this description.

Figure 1:
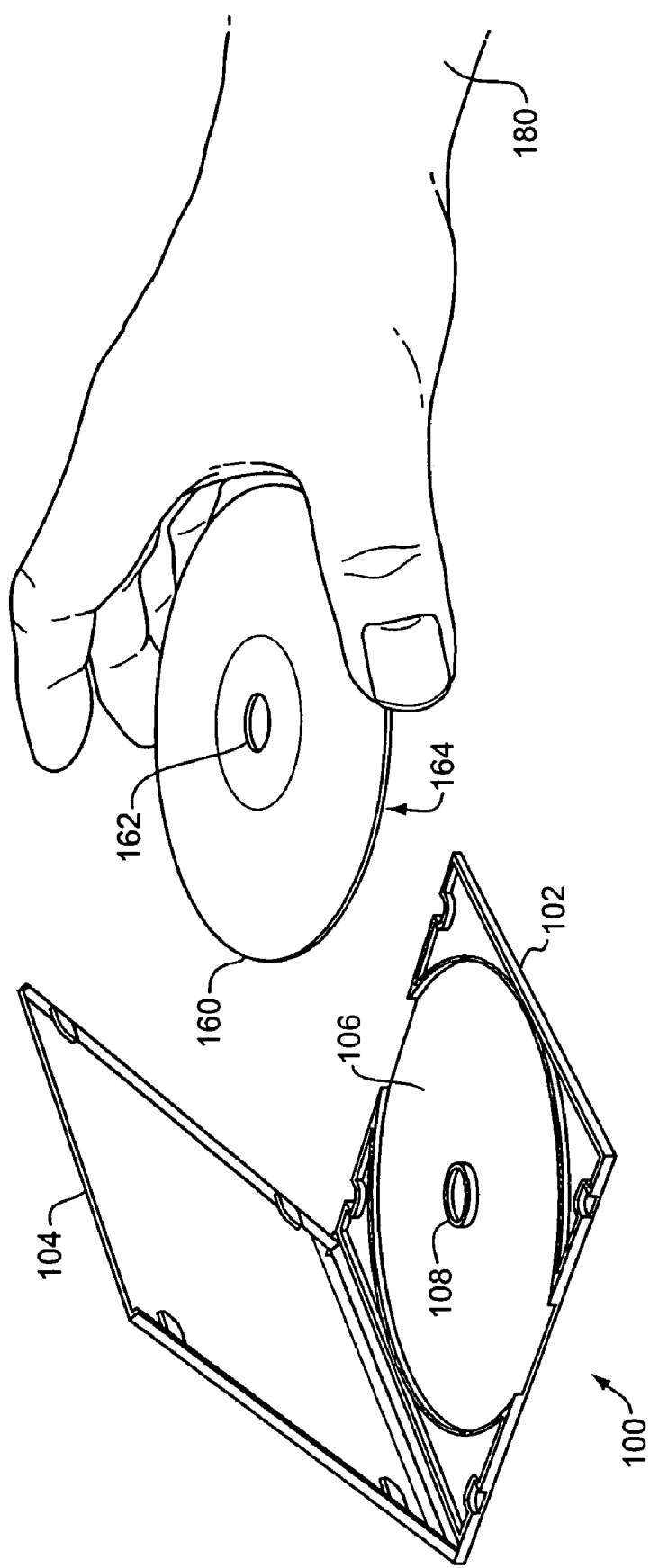
FIG. 1 is a perspective view showing a prior art jewel case that may be used to store a CD or DVD disc.
Figure 2:
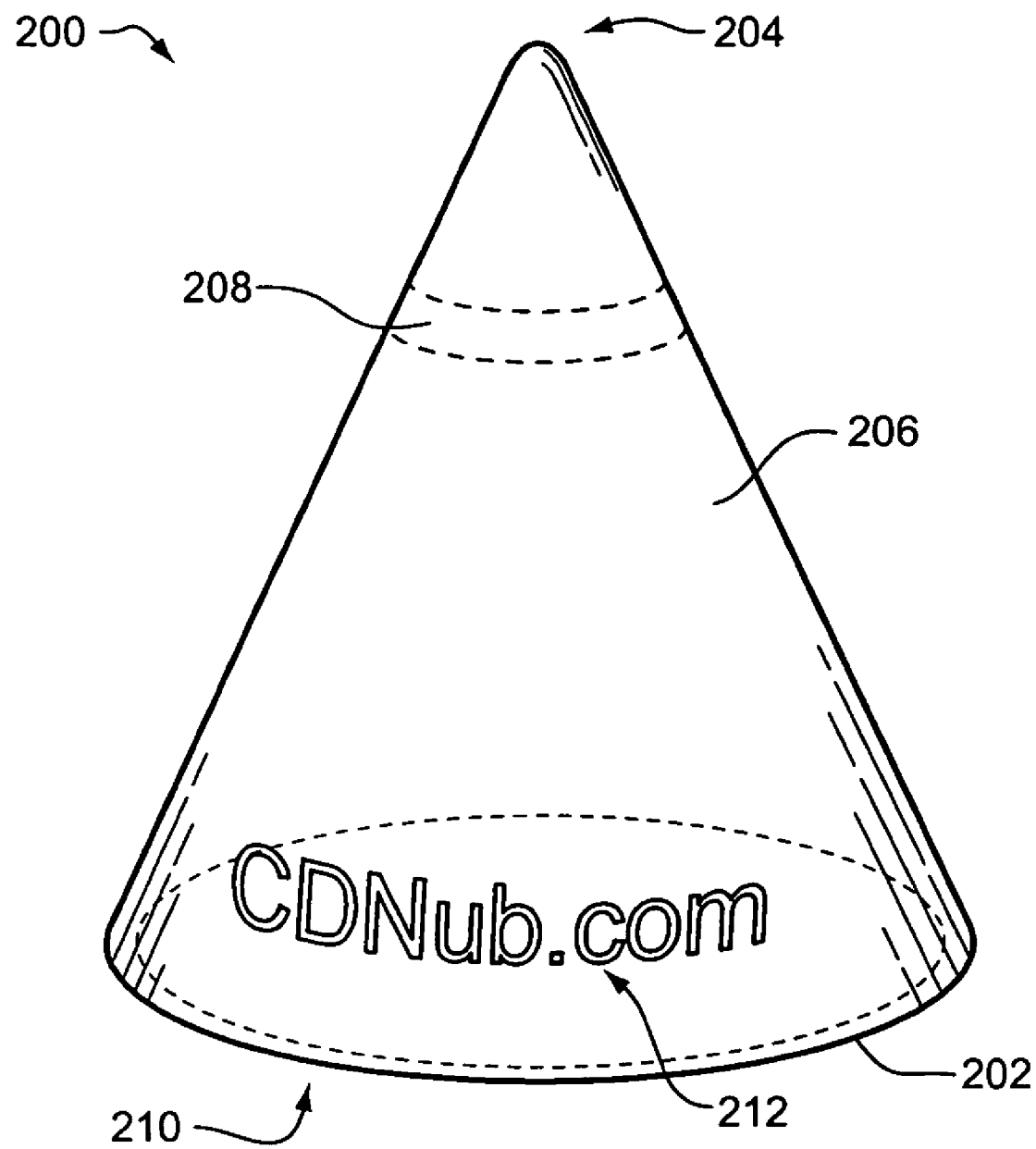
FIG. 2 is a perspective view showing a disc holder having a conical shape, according to one embodiment of the invention, which may be used to hold an object having an interior hole.

FIG. 2 is a perspective view showing a holder 200 having a conical shape, according to one embodiment of the invention, that may be used to hold an object having an interior hole, such as a CD, DVD, other data storage disc having an interior hole, or other object having an interior hole (e.g., a ring, watch, bagel, doughnut, or the like). To further illustrate the concepts, the holder will be primarily described in the context of a disc holder, although the invention is not so limited. The holder has the shape of a hollow, right, circular cone, and includes a circular base 202, a tapered top 204, curved sides 206 connecting the base with the top, and an interior void 210.

The tapered top 204 may be dimensioned smaller than a diameter of an interior hole of a data storage disc, for example a CD or DVD, in order to allow the top to pass through the hole, if the disc is placed on the holder. In the illustrated embodiment, the tapered top resembles a vertex of a cone, but is optionally non-pointed, in this case rounded so that the point is removed. The inventor has discovered that such rounding of the top may help to reduce scratching of the disc, as it is placed on, or removed from the disc holder. However, in an alternate embodiment of the invention, no rounding of the top is required.

The curved sides 206 slope from the base 202 to the top 204. The sides include a disc support surface 208 to support the disc. The disc support surface may have a predetermined dimension, in the case of the illustrated disc holder a diameter, which is based on, or at least related to, a diameter of the interior hole of the disc. In one aspect, the diameter of the disc support surface is just greater than the diameter of the hole of the disc to prevent the disc from settling down further towards the base. Due to the sloping sides, a first portion of the sides, above the disc support surface, has a dimension that is less than the diameter of the hole of the disc, and a second portion of the sides, below the disc support surface, has a dimension that is greater than the diameter of the hole of the disc. The illustrated disc support surface is sloping, although this is not required. In an alternate embodiment of the invention, a horizontal disc support surface, such as a ledge, may also optionally be employed.

In one exemplary embodiment of the invention, the height of these exemplary disc holders may be about 5 cm. The circular base may have a diameter of about 4.5 cm. The thickness of the wall may be about 2 mm. The walls may have optional lips at the base. The lips may help to enhance the stability of the holder and help to reduce tilting. The top of the cone and pyramid may be rounded or flattened to an extent that a cross sectional dimension of the top rounded surface was about 2 mm. It should be noted that these dimensions are provided for illustration only, and are non-limiting. Different dimensions may also optionally be used (see e.g., FIG. 7).

In one aspect, a disc may be conveniently placed on the disc holder for easy access. A method of using the disc holder, according to one embodiment of the invention, may include removing a disc, such as a CD or DVD, from a disc source location, such as a jewel case, sleeve, disc player, CD player, DVD player, disc writer, CD writer, DVD writer, or computer system. The method may then include placing the disc on the disc holder.

Figure 3:
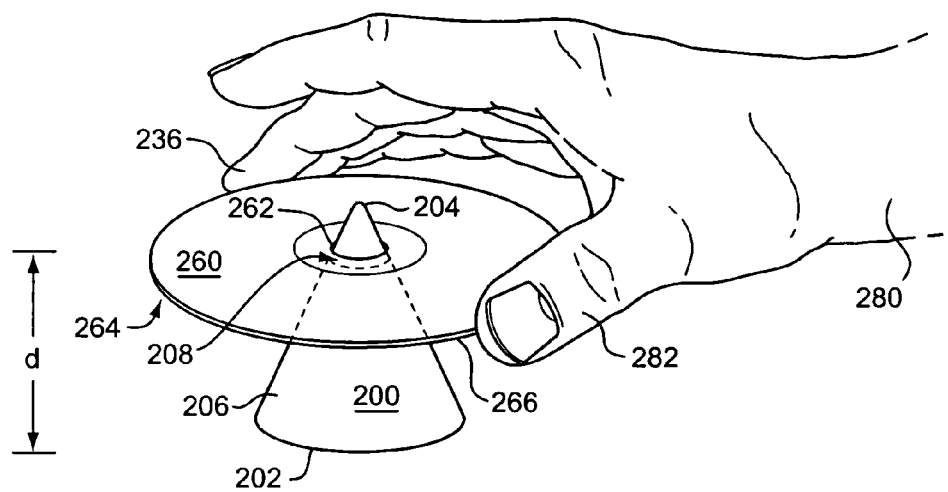
FIG. 3 is a perspective view showing a user placing a disc having an interior hole on a disc holder, according to one embodiment of the invention.

FIG. 3 is a perspective view showing a user 280 placing a disc 260 having an interior hole 262 on a disc holder 200, according to one embodiment of the invention. As shown, the user may hold the disc by an edge 266 thereof with her thumb 282 and opposing middle finger 286. Holding the disc along the edges may offer the advantage of reduced contamination of a sensitive data surface 264 of the disc with skin oils from the fingers. In placing the disc on the disc holder, the user may simply move or manipulate the disc so that the top 204 passes through the hole of the disc, and the disc rests on the disc support surface 208.

Figure 4:
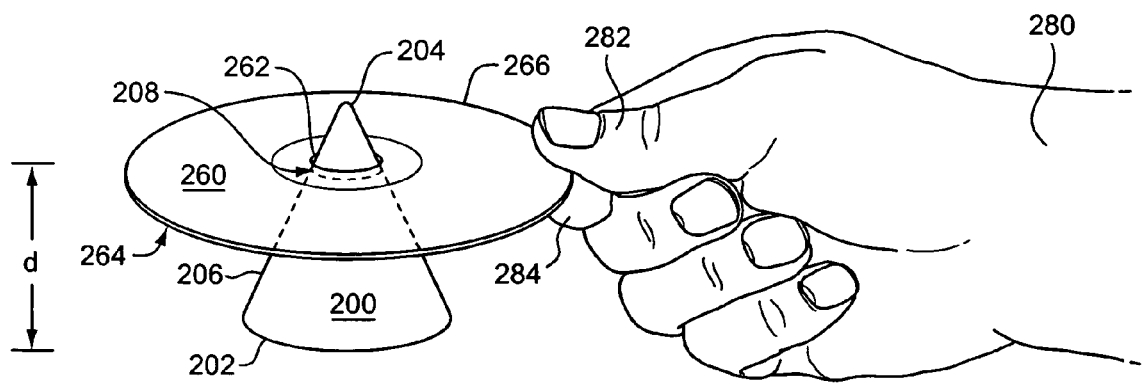
FIG. 4 is a perspective view showing a user placing a disc having an interior hole on a disc holder, according to another embodiment of the invention.

Holding the disc along its edges is not required. FIG. 4 is a perspective view showing a user 280 placing a disc 260 having an interior hole 262 on a disc holder 200, according to an alternate embodiment of the invention. In this embodiment, the user may pinch a portion of the disc near the edge 266 between her thumb 282 and index finger 284. The gap between the base and the data support surface allows the index finger beneath the bottom surface of the disc, when the disc is resting on the disc holder, so that the user may pinch the disc while it is positioned on the disc holder.

The disc holder generally provides a safe and convenient place to hold or store the disc that substantially avoids scratching and contamination. While on the disc holder, the data surface of the disc generally contacts only air. Accordingly, using the disc holder should significantly reduce contamination compared to placing the disc on a surface.

When the disc is needed, the user may readily obtain the disc from the disc holder. The disc holder generally holds the disc in a convenient and accessible manner. A method of using the disc holder, according to another embodiment of the invention, may include removing the disc from the disc holder, for example by lifting the disc vertically off the disc holder, and then introducing the disc into a disc destination location, such as a jewel case, sleeve, CD player, DVD player, or computer system, for example.

With reference to FIGS. 3–4, the disc support surface 208 overlies the base 202 by a distance "d". In one embodiment of the invention, the distance "d" may be at least about 1 cm. The inventor has discovered that providing a distance of at least 1 cm may facilitate access to the edges and bottom surface of the disc when removing the disc from the disc holder. The distance may allow a user to place at least a portion of a finger below the edge of the disc to help hold and remove the disc. Recall from the discussion in the background, that such gaps are generally not available when the disc is placed flat on a surface. In such a case, taking hold of the disc along its edges is generally not easy or convenient, and this tends to promote sliding the disc across the surface.

In one embodiment of the invention, the distance "d" may be based on the size and ergonomics of operation of a human hand. For example, in various embodiments, the distance "d" may be between 1 to 10 cm, 2 to 6 cm, or 3 to 5 cm. The inventor has found that it is generally ergonomic and comfortable for a thumb and index finger of a hand resting on a surface to hold the edges of a disc if the disc is positioned 1 to 10 cm over the surface. Greater distances are generally possible, although the hand generally needs to be supinated to an uncomfortable extent, which is not ergonomic. For large proportions of people, the appropriate range of distance may be between 2 to 6 cm, or between 3 to 5 cm, and the distance "d" of embodiments may be within these ranges. The inventor hopes and believes that disc holders incorporating such gaps may allow greater comfort in use, and may, due to their ergonomic design, promote proper holding of the disc by its edges.

Accordingly, the gap between the base and the disc support surface both helps to prevent scratching and allow greater access to the edges and bottom surface of the disc, for ease of removal. It is noted that the disc holder may also allow the disc to be accessed readily, and conveniently, without having to open a hinged jewel case, or unbind the disc from a post.

Referring again to FIG. 2, the disc holder 200 includes a void 210 defined by the base 202, the top 204, and the sides 206. A potential advantage of the void may be elimination of materials of construction, for example plastic material, which may allow the disc holder to be fabricated more cost effectively. The elimination of this material may also make the device lighter. Alternatively, the void may be eliminated, if weight is desired, for example in a combined use of the device as a disc holder and paperweight.

Another potential advantage of the void may be an ability to stack a plurality of disc holders, one over the other, with a top of a lower disc holder inserted into the void of an upper disc holder. It should be noted that terms such as "top", "upper", "lower", "vertical", "horizontal", and the like, are used herein to facilitate the description of the structure of disc holders illustrated or described. The disc holders may be used in a variety of orientations, including angled orientations. For example, the disc holders may be stacked along a horizontal axis. The stacking of the disc holders may help to reduce costs and space during storage, and shipping, for example.

In one embodiment of the invention, the disc holder may be fabricated of a non-opaque material. For example, the disc holder may be fabricated of a material that is at least partially transparent, or translucent. If desired, the material may be sufficiently transparent or translucent to allow a user to view three-dimensional structure of the backside of the disc holder. In addition, this may give the disc holder pleasing visual appearance, which may help to enhance its acceptance, and promote disc protection. A wide variety of plastic materials, inorganic materials, glasses, quartz, and like materials are suitable. In one aspect, if desired, the material may include a glow-in-the-dark material, such as a phosphorescent dye, which may be incorporated into the plastic material. This may help the user to locate the disc holder in a dark or dimly lit environment. In another embodiment of the invention, the material, whether opaque or non-opaque, may be colored, for example green, purple, red, or blue. This may further help the user to locate the disc holder quickly, and promote use, and disc protection. It is also hoped that an overall ornamental appeal may help to increase the staying power of the disc holder on desks, and in other environments where discs are used.

With continued reference to FIG. 2, if desired, in one embodiment of the invention, the disc holder may have optional advertising information 212 displayed on its sides. That is, the disc holder may serve as an advertisement apparatus. For example, the disc holder may have displayed the text CDNub.com, as shown in the illustrated embodiment. CDNub™ and CDNub.com are a registered trademarks or trademarks of Joseph Eric Watson, of Denver, Colo. The advertising information may be displayed via raised or relief letters, or with print, as in a label, for example. The display of the advertising information may provide a way for companies to cost effectively target disc users. In one embodiment of the invention, the advertising information may include advertising information for the disc holder. In another embodiment of the invention, the advertising information may include advertising information for a company associated with the disc, for example a record company, a movie company, or a software company. Alternatively, the advertising information may be for a company associated with disc players or writers, such as a CD player company, a DVD player company, or a computer company. Office supply companies and others may also benefit. As opposed to a paper advertisement, or the like, the functionality of the disc holder, may offer staying power on a desk, or other surface proximate a disc player (e.g., within arms reach).

Figure 5:
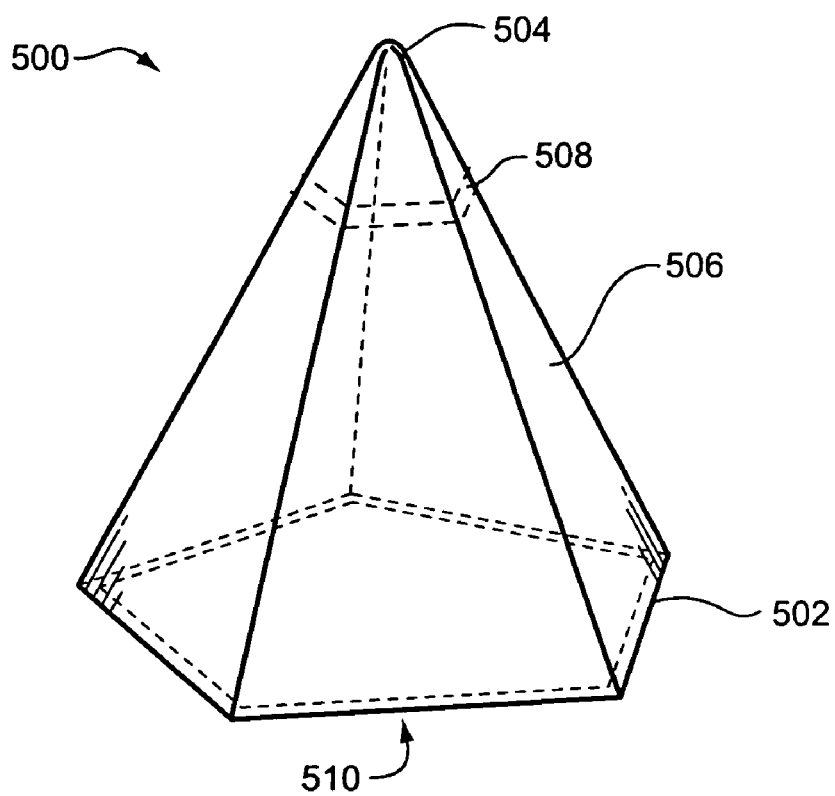
FIG. 5 is a perspective view showing a disc holder having a pyramidal shape, according to one embodiment of the invention.

A disc holder having a generally conical shape has been used to illustrate certain concepts of the invention. However, the use of a conical shape for the disc holder is not required. FIG. 5 is a perspective view showing a disc holder 500 having a pyramidal shape, according to one embodiment of the invention. The disc holder includes a polygonal (pentagonal) base 502, a tapered top 504, and a plurality of substantially triangular sides 506 that connect the base with the top. The polygonal base may have the shape of a closed plane figure that is bounded by three or more usually straight sides that are connected endpoint to endpoint. The illustrated polygonal base has a pentagonal shape, although triangles, squares, rectangles, hexagons, heptagons, octagons, and higher-sided polygons may also optionally be employed. The tapered top of the illustrated disc holder is optionally rounded and the upper corners of the substantially triangular sides are correspondingly rounded. The disc holder includes a disc support surface 508 on the sides that may be used to support a disc having an interior hole. The disc holder also includes an internal void 510. A variety of other shapes are also contemplated (see e.g., FIG. 7, below).

Figure 6A:
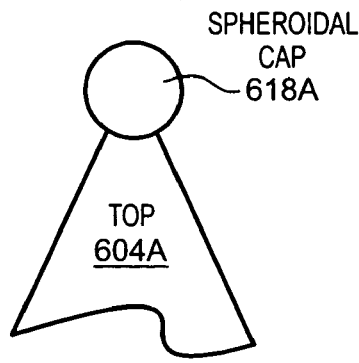
FIG. 6A is a front elevation view of a top of a disc holder having a spheroidal cap, according to one embodiment of the invention.
Figure 6B:
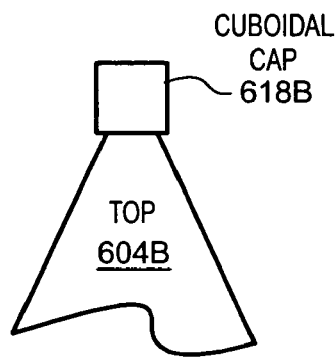
FIG. 6B is a front elevation view of a top of a disc holder having a cuboidal cap, according to one embodiment of the invention.
Figure 6C:
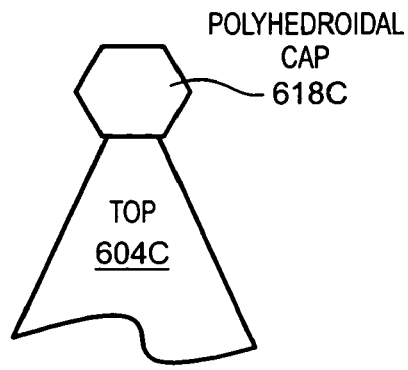
FIG. 6C is a front elevation view of a top of a disc holder having a polyhedron shaped cap, according to one embodiment of the invention.

Now, as previously discussed, scratching of optical data storage discs is generally undesirable. FIGS. 6A–6C show various exemplary caps that provide rounded top surfaces for disc holders to further reduce scratching. The cap may cover or eliminate the tapered or pointed end of a cone, pyramid, or other shape, and may help to protect the disc from potential scratching.

FIG. 6A is a front elevation view of a top 604A of a disc holder having a spheroidal cap 618A, according to one embodiment of the invention. The spheroidal cap may be, but need not be, completely spherical.

FIG. 6B is a front elevation view of a top 604B of a disc holder having a cuboidal cap 618B, according to one embodiment of the invention. The cuboidal cap may be, but need not be, a perfect cube. For example, the cuboidal cap may have rectangular sides.

FIG. 6C is a front elevation view of a top 604C of a disc holder having a polyhedron shaped cap 618C, according to one embodiment of the invention. Polyhedrons are solids formed by plane faces. The cap may be, but need not be, shaped like a perfect polyhedron. Other polyhedrons than that illustrated may also optionally be employed.

The caps may have a cross-sectional dimension, such as a diameter in the case of a sphere, or a length or width in the case of a cube, that is less than a diameter of a hole of a data storage disc. This may allow the caps to pass through the hole. Further, as shown, the caps may include a non-pointed top surface, which offers a greater surface area than the tapered top. This may help to reduce scratching. The increased size of the caps may also help to keep the discs from falling off of the disc holder.

In one aspect, the cap may be made of the same material as the base. For example, both the top and the cap may be a plastic material. In another aspect, the cap may include a different material than the top. For example, a metal cap may be used on a non-metal top, such as a plastic top. In one aspect, the cap may include a material that is less likely to scratch the disc, such as a smooth metal, or a soft material. As will be discussed further below, the cap may include a conductive material, such as a metal, to help conduct static electricity away from the disc holder. The metal cap may also provide added weight, for example, so the holder may be used as a paperweight.

Figure 7:
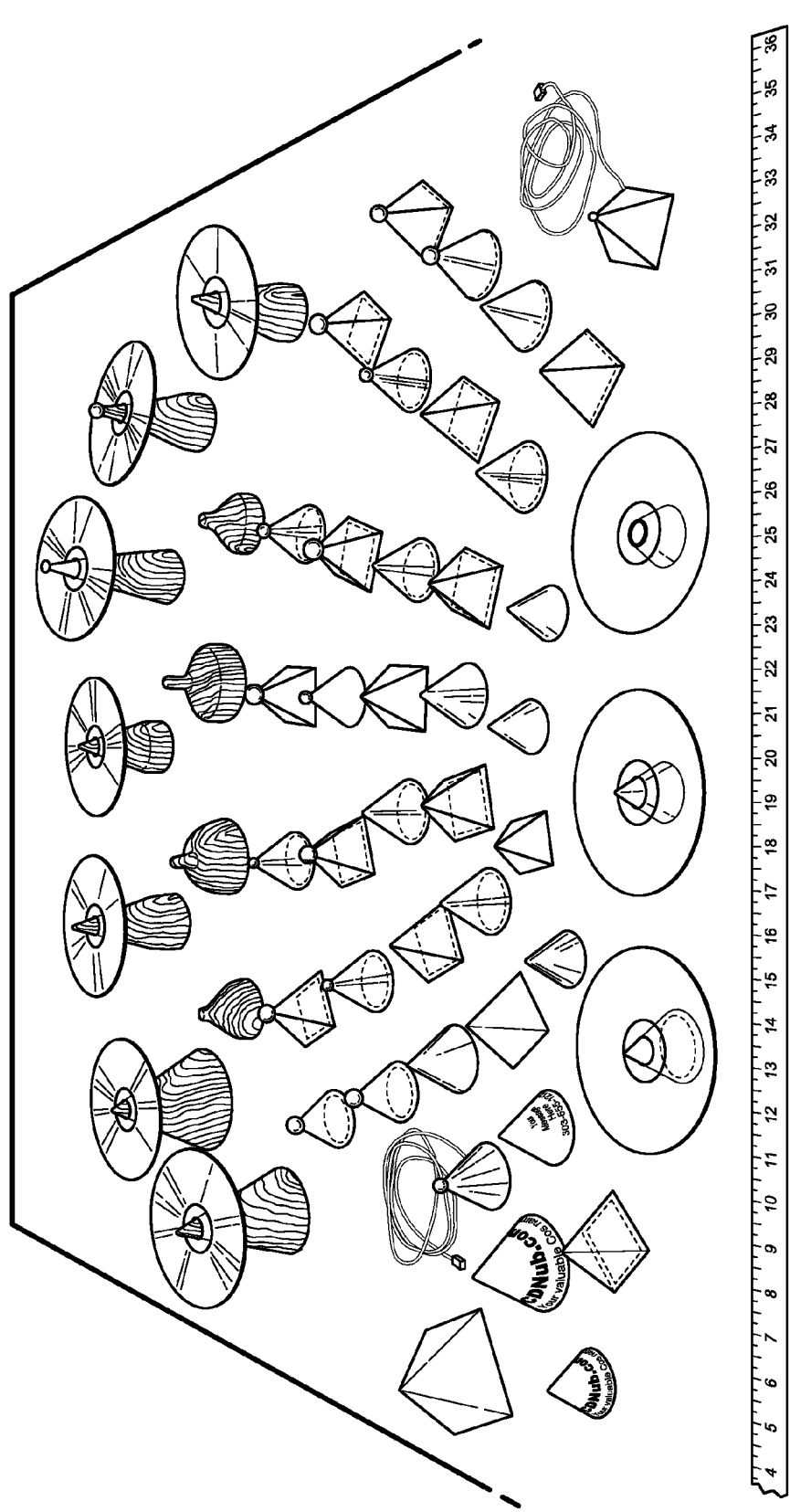
FIG. 7 is a perspective view showing exemplary disc holders, according to various embodiments of the invention.

The inventor has made and used a wide variety of disc holders, some of which have caps, and some of which do not. FIG. 7 is a perspective view showing various exemplary disc holders that the inventor has made and used, according to various embodiments of the invention. The disc holders are made of various different materials, including wood, plastic, and metal. The use of the metal, wood, or a non-hollowed version, for example, may be appropriate to give the holder more weight, for example in the case of a paper holder, or stability. Some of the disc holders have voids and some do not. In addition to these disc holders, the inventor also contemplates that numerous other shapes may also optionally be employed. For example, other geometric shapes may be employed. Likewise, the inventor contemplates employing figurines. For example, unicorn, camel, or other animal figurines may be employed. By way of example, the unicorn and the camel may hold discs on a horn, or hump, respectively.

Now, static electricity is another potential problem that presents itself in environments where CD's, DVD's, and other discs are used. The static electricity may potentially damage electrical equipment. In addition, static buildup on a disc may tend to cause accumulation of dust and other particles on the data surface.

Figure 8A:
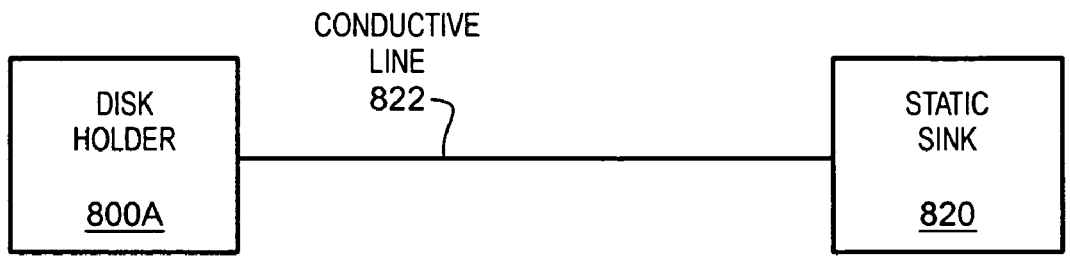
FIG. 8A is a block diagram of a static removal system to discharge or otherwise remove static electricity from a disc holder, according to one embodiment of the invention.

FIG. 8A is a block diagram of a static removal system 819 to discharge or otherwise remove static electricity from a disc holder 800A, according to one embodiment of the invention. The static removal system includes a disc holder 818A including an electrically conductive material, a conductive line 822 coupled at a first end thereof with the electrically conductive material of the disc holder, and a static electricity sink 820 coupled with the conductive line at a second end thereof. The disc holder may be the same or different than other disc holders disclosed herein. There is no requirement that the disc holders disclosed elsewhere herein be used in this embodiment. The conductive material of the disc holder and the conductive line may form a conductive path to conduct static electricity from the disc holder to the sink. Removing static electricity may help to protect electrical equipment from potential static damage. Also, removing the static electricity may help to prevent a static charge on the disc, which may tend to attract dust and other airborne particles.

The conductive material and the conductive line may include metals, conductive plastics, or other conductive materials known in the arts. In one embodiment of the invention, the conductive line may include a metal wire. For example, the conductive line may include a length of a 20 Gauge or greater multi-stranded copper wire. Use of this particular conductive line is not required.

As discussed above, the second end of the conductive line may be conducted to the static electricity sink. In one embodiment of the invention, the second end of the conductive line may include a standard eyelet electrical connector, and the sink may include a grounded screw to which the eyelet electrical connector may be attached. In one aspect, the grounded screw may include a screw between a standard AC power outlet. In another aspect, the grounded screw may be that of a housing of a computer system or other electrical device.

In another embodiment of the invention, the second end of the conductive line, or an eyelet or other connector attached thereto, may be attached with an adhesive, or conductive adhesive, to metal of the housing of the computer system or other electrical device having a three-pronged power cord.

In yet another embodiment of the invention, the second end of the conductive line, or an eyelet or other connector attached thereto, may be connected with the ground hole of an AC power outlet. For example, an eyelet connector attached to the second end of the conductive line may be inserted into a banana jack and the banana jack may be inserted into the ground hold of the AC power outlet. As is known, banana jacks are standard electrical connectors, often used in home stereo systems. The male banana connector, in particular, may provide an effective static ground attachment.

In a still further embodiment of the invention, the second end of the conductive line may be attached to an adapted three-pronged plug having only the ground wire. Then, the ground wire of the plug may be inserted into an AC power outlet. Other connections to ground known in the arts may also optionally be employed.

Figure 8B:
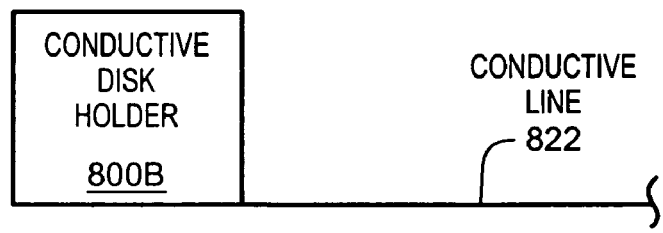
FIG. 8B is a block diagram showing a conductive disc holder and a conductive line coupled with the disc holder, according to one embodiment of the invention.

FIG. 8B is a block diagram showing a conductive disc holder 800B and a conductive line 822 coupled with the disc holder, according to one embodiment of the invention. The conductive disc holder may include a metal disc holder. For example, the conductive disc holder may include a hollow, right, circular, metal cone. The metal may include aluminum, brass, copper, or gold or silver-plated metal, for example. The conductive line may be electrically coupled with the conductive disc holder by solder, screws, clamps, crimping, conductive adhesives, glue, tape, or other approaches known in the arts.

Figure 8C:
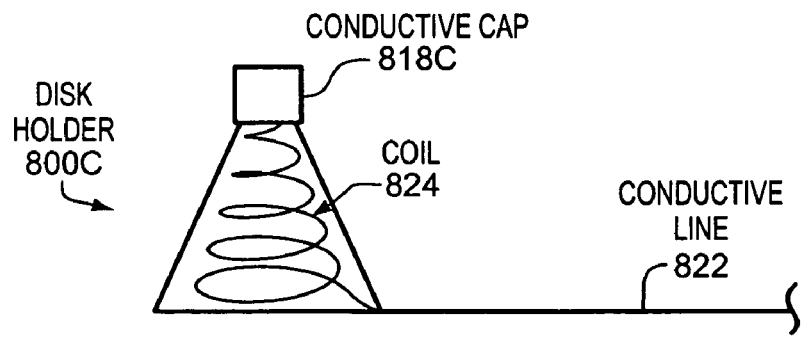
FIG. 8C is a block diagram showing a conductive cap of a disc holder, and a conductive line coupled with the cap, according to one embodiment of the invention.

In another embodiment of the invention, only a portion of the disc holder may be conductive. FIG. 8C is a block diagram showing a disc holder 800C, a conductive cap 818C of the disc holder, and a conductive line 822 coupled with the conductive cap, according to one embodiment of the invention. The conductive cap may include a metal cap, for example. Aside from the cap, the disc holder need not be conductive. In one aspect, the conductive line may optionally include a coil 824 or other formed shape. The coil may help to dissipate static charge due to resistance. Alternatively, the coil is not required, and the portion of the conductive line inside the disc holder may also be discretely run along the side of the wall.

Figure 8D:
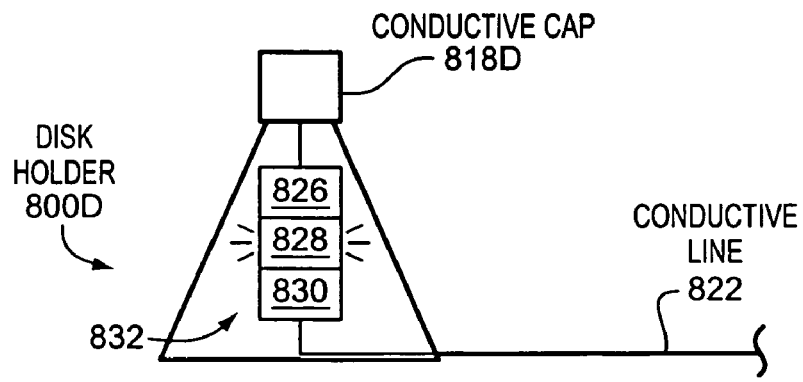
FIG. 8D is a block diagram showing a disc holder having a visible indicator to indicate when static is removed from the disc holder, according to one embodiment of the invention.

In yet another embodiment of the invention, the disc holder may have a visible or audible indicator to indicate when static electricity is removed from the device to the sink. FIG. 8D is a block diagram showing a disc holder 800D having at least one non-opaque side, a conductive cap 818D of the disc holder, a conductive line 822 coupled with the conductive cap, and a visible indicator 832 coupled with the conductive line, according to one embodiment of the invention.

The illustrated visible indicator 832 includes a static electricity sensor 826, such as a static electricity switch, coupled with the conductive line to sense static electricity current on the conductive line, a light generating device 828, such as a light emitting diode (LED) or a bulb, coupled with the static electricity sensor to generate light when the static electricity sensor senses static electricity on the conductive line, and an optional source of power 830, such as a battery, coupled with the light generating device to provide power to allow the device to generate the light. Exemplary static electricity sensors include, but are not limited to, Faraday switches, touch-activated switches, and Faraday-capacitance proximity switches. These switches are known in the arts and may be self-excited, and have momentary operation. Such switches may flash the LED or other light generating device as the static electricity is being discharged or grounded. The switch may receive power from the battery (e.g., a 5 volt DC battery) or other source of power. One other exemplary source of power includes an AC to DC transformer operating at, for example, between 3 to 9 volts. If desired, a portion of the conductive line inside the disc holder may be coiled or otherwise shaped, for example to improve dissipation of static electricity. The switch may turn on the LED, which may derive power from the battery, when static electricity is removed from the conductive cap to the sink. Advantageously, the indicator may provide a feedback system to apprise a user that static has been discharged from the disc holder.

In an alternate embodiment of the invention, the source of power 830 may be omitted, and power may be conveyed to the light generating device from the conductive line. For example, a small transformer located with the ground at an AC power outlet to which the second end of the conductive line is coupled may provide the power Exemplary transformers that may be employed include, but are not limited to, Model 3VDC 100MA Wall Transformer (Cat#DCTX-31), Model 5VDC 1200MA Wall Transformer (Cat#DCTX-512), and Model 9VDC 300MA Wall Transformer (Cat#DCTX-926), available from All Electronics Corp.

In various alternate embodiments of the invention, the disc holder may include a visible or audible indicator, in one particular instance an LED, that is controlled based on various environmental conditions. In one aspect, the indicator may be activated when the disc holder is touched, for example when a conductive cap or other material of the holder is touched or when a button is pushed. Components employed in conventional lamps and other apparatus are potentially suitable. Another suitable component includes 5 LED Sequential Flasher Model#CK1006. In another aspect, the indicator may be activated based on sound. For example, the LED may flash when music is being played, when the phone rings, or based on other audible stimulus. In one particular aspect, the LED may flash when music from a CD is played. A suitable component includes 5 LED Sequential Flasher Model#CK1006 combined with Sound Activated Switch, Model K36, available from Carl's Electronics Inc., of Sterling, Mass. In a still further aspect, the indicator may be activated when radiofrequency radiation is detected, for example from a remote control, a cell phone, a like radiofrequency emitting device. A suitable radiofrequency sensitive component includes Model #88-990, available from Philmore/LK Industries, of Rockford, Ill.

Figure 9:
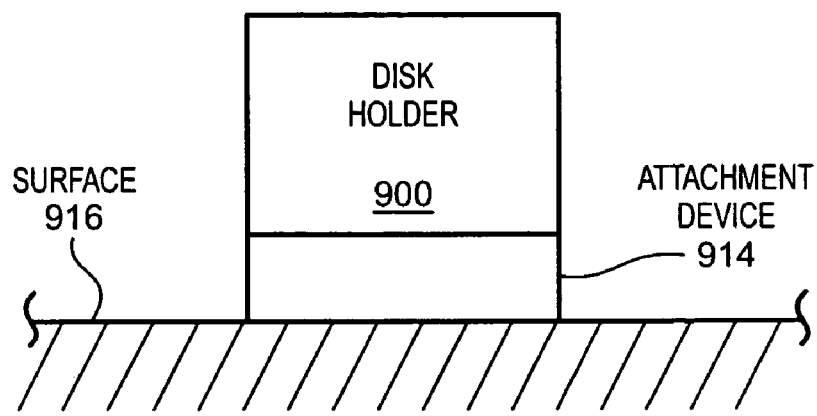
FIG. 9 is a front elevation view of a disc holder that is attached to a surface by an attachment device, according to one embodiment of the invention.

FIG. 9 is a front elevation view of a disc holder 900 that is attached to a surface 916 by an attachment device 914, according to one embodiment of the invention. The disc holder may be similar to other disc holders disclosed herein but is coupled with the attachment device. The attachment device may include a suction cup, a magnet, an adhesive, glue, screws, bolts, Velcro, small attachment hooks or loops, and other attachment devices known in the arts.

In one embodiment of the invention, the point of attachment to the surface may be proximate, for example within arms reach of, an electronic disc utilization device, such as a disc player, or a disc writer. For example, the point of attachment to the surface may be within arms reach of a CD player, a DVD player, or a computer system. In one particular embodiment of the invention, the surface may include a desktop on which is provided a computer system. While the illustrated surface is a horizontal surface, the disc holder may also include a vertical extender having a length that is based on the radius of a disc, to attach to a vertical surface, if desired.

Now let us briefly discuss approaches that may optionally be used to make the various holders disclosed herein. In one embodiment of the invention, the disc holders may be fabricated of a plastic material by a plastic material forming process. The use of a plastic material may offer a number of advantages including a generally low material cost and availability of low cost and high volume forming processes. An exemplary plastic material that the inventor has used to form disc holders is transparent crystalline polystyrene, which is available from numerous sources. This material generally has the advantages that it has a relatively low cost, is transparent, and has an appealing look when colors are added. Polycarbonate also offers similar advantages and may also optionally be used. Certain rubber materials, such as polyisoprene rubber, butadiene rubber, and silicone rubber, also are generally cost effective and readily formed to shape. Other plastic materials that are also suitable include, but are not limited to, polyethylenes, polypropylenes, acrylic polymers, poly(methyl methacrylate), poly(vinyl esters), Styrofoam(R) brand expanded rigid polystyrene plastic, polyamides, polyesters, phenolic resins, polyester resins, epoxy resins. In one aspect, if desired, a material of the disc holder may be softer than a material of the disc, for example softer than polycarbonate, to help prevent scratching. Exemplary material softer than polycarbonate includes a variety of rubber materials, certain woods, and plastics such as low-density polyethylene.

A variety of forming processes may be used for these plastic materials, as well as other materials, such as glass. Exemplary forming processes include molding and casting. A potential advantage of the holders disclosed herein is their simplicity, amenable to mass production, and generally low cost of production. Exemplary molding processes that are known in the arts include, but are not limited to, compression molding, injection molding, blow molding, reaction-injection molding, rotational molding, thermoset molding, and transfer molding. If desired, a hot-runner mold may be employed to reduce scrap material. In one particular exemplary embodiment of the invention, the disc holder may be formed of transparent crystalline polystyrene plastic material by an injection molding process. If desired, the injection molding may be outsourced to numerous injection mold operators.

The use of a plastic material and a plastic forming process have heretofore been described, although other materials and forming methods may also optionally be employed. In an alternate embodiment of the invention, the disc holder may be formed of a variety of non-plastic materials, such as metals (e.g., aluminum, stainless steel, copper, brass), glass, ceramic, rubber, cardboard, paper, wood, and other materials known in the arts. The use of metals may offer the potential advantage of discharge of static electricity. Wood may be mechanically shaped, for example by a wood lathe, cutting, carving, drilling, and the like. Metals, glass, and rubber may also be mechanically shaped. In addition, metals, glass, and some rubbers may often be melted, and molded. Ceramics may be molded and fire kilned. Paper, cardboard, cloth, plastic sheets, and like flexible materials may, for example, be cut, folded, and optionally glued, stapled, or otherwise adhered in place. If desired, templates showing where to cut and fold may be printed on the flexible materials with a computer.

Referring again to FIG. 6A–C, if a cap is desired, in one aspect, the cap may be attached to the top with glue (e.g., epoxy glue). Alternatively, the cap and the top may be integral from the beginning. For example, the top and the cap may be lathed from a common workpiece, or formed concurrently in a single mold by injection molding.

In the description above, for the purposes of explanation, numerous specific details have been set forth in order to provide a thorough understanding of the embodiments of the invention. Other embodiments may be practiced without some of these specific details. It is to be realized that variations in size, materials, shape, form, function and manner of operation, assembly and use, which are readily apparent to one of ordinary skill in the art, having the benefit of the present disclosure, and all equivalent relationships to those illustrated in the drawings, and described in the specification, are intended to be encompassed by the present invention. In other instances, well-known structures, devices, and techniques have been shown in simplified form or without detail in order not to obscure the understanding of this description.

Many of the methods are described in their most basic form, but operations may be added to or deleted from the methods. It will be apparent to those skilled in the art that many further modifications and adaptations may be made. The particular embodiments are not provided to limit the invention but to illustrate it. The scope of the invention is not to be determined by the specific examples provided above but only by the claims below.

In the claims, any element that does not explicitly state "means for" performing a specified function, or "step for" performing a specified function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While the invention has been described in terms of several embodiments, those skilled in the art will recognize that the invention is not limited to the embodiments described, but may be practiced with modification and alteration within the spirit and scope of the appended claims. For example, while the invention has been described largely with respect to CD's and DVD's, it is appreciated that other discs with other dimensions may become available in the future. The description is thus to be regarded as illustrative instead of limiting.

What is claimed is:

1. An apparatus comprising:
   a base having a shape of a closed plane figure that is selected from the group consisting of a circle, an oval, and a polygon;
   a tapered top over the base, the top being dimensioned smaller than a diameter of an interior hole of an optical storage disc that is selected from the group consisting of a CD and a DVD in order to allow the top to pass through the hole;
   a rounded surface of the tapered top to reduce scratching of a surface of the disc;
   sloping sides connecting the top with the base;
   a disc support surface of the sloping sides to support the disc if the top is passed through the hole and the disc is rested on the sloping sides, wherein the disc support surface overlies the base by at least one centimeter;
   an interior void defined by the base, the top, and the sides;
   a conductive material;
   a conductive line coupled with the conductive material to conduct static electricity away from the conductive material; and
   an indicator coupled with the conductive line to indicate when static electricity is conducted away from the conductive material.

2. The apparatus of claim 1, wherein the base, the sides, and the top comprise an injection molded plastic material.

3. An apparatus comprising:
   a base having a shape of a closed plane figure that is selected from the group consisting of a circle, an oval, and a polygon;
   a tapered top over the base, the top being dimensioned smaller than a diameter of an interior hole of an optical storage disc that is selected from the group consisting of a CD and a DVD in order to allow the top to pass through the hole;
   a rounded surface of the tapered top to reduce scratching of a surface of the disc;
   sloping sides connecting the top with the base;
   a disc support surface of the sloping sides to support the disc if the top is passed through the hole and the disc is rested on the sloping sides, wherein the disc support surface overlies the base by at least one centimeter;
   an interior void defined by the base, the top, and the sides,
   wherein the base, the sides, and the top comprise an injection molded plastic material, and
   wherein the plastic material comprises a glow-in-the-dark material.

4. A method comprising placing an optical storage disc on the apparatus of claim 3.

5. The apparatus of claim 3, wherein the rounded top comprises a cap.

6. The apparatus of claim 3, further comprising advertising information displayed on the sides.

7. The apparatus of claim 3, further comprising an attachment device to attach the base to a surface.

8. An apparatus comprising:
   a base;
   a top that is dimensioned smaller than a diameter of an interior hole of a data storage disc to allow the top to pass through the hole;
   sides connecting the top with the base; and
   a disc support surface of the sides to support the disc if the top is passed through the hole and the disc is rested on the sides;
   a conductive material;
   a conductive line coupled with the conductive material to conduct static electricity away from the conductive material; and
   an indicator coupled with the conductive line to indicate when static electricity is conducted away from the conductive material.

9. A method comprising placing an optical storage disc on the apparatus of claim 8.

10. The apparatus of claim 8, wherein the top is rounded.

11. The apparatus of claim 10, wherein the rounded top comprises a cap.

12. The apparatus of claim 8:
   wherein the base comprises a shape of a circle;
   wherein the sides comprise curved sides of a cone; and
   wherein the top comprises a vertex of the cone.

13. The apparatus of claim 8:
   wherein the base comprises a shape of a polygon;
   wherein the sides comprise a plurality of substantially triangular sides of a pyramid; and
   wherein the top comprises a vertex of the pyramid.

14. The apparatus of claim 8, wherein the disc is selected from the group consisting of a CD and a DVD.

15. The apparatus of claim 8, further comprising advertising information displayed on the sides.

16. An apparatus comprising:
   a disc holder including an electrically conductive material;
   a conductive line coupled at a first end thereof with the electrically conductive material of the disc holder to conduct static electricity away from the conductive material; and
   an indicator to indicate when static is removed from the disc holder.

17. The apparatus of claim 16, wherein the conductive line comprises a wire.

18. The apparatus of claim 16, wherein the electrically conductive material of the disc holder comprises a conductive cap.

19. The apparatus of claim 16, wherein the indicator comprises:
   a static electricity sensor coupled with the conductive line to sense static electricity current on the conductive line;
   a light generating device coupled with the static electricity sensor to generate light when the static electricity sensor senses static electricity on the conductive line; and
   a source of power coupled with the light generating device to provide power to allow the device to generate the light.

20. A method comprising placing a disc on the apparatus of claim 16.

* * * * *